United States Patent
Parolini (10) Patent No.: US 11,080,751 B1
(45) Date of Patent: Aug. 3, 2021

(54) PARCEL ADVERTISING

(71) Applicant: Nicholas Lee Parolini, Lakeland, FL (US)

(72) Inventor: Nicholas Lee Parolini, Lakeland, FL (US)

(*) Notice: Subject to any disclaimer, the term of this patent is extended or adjusted under 35 U.S.C. 154(b) by 0 days.

(21) Appl. No.: 17/103,770

(22) Filed: Nov. 24, 2020

(51) Int. Cl.
| | |
|---|---|
| *G06Q 30/02* | (2012.01) |
| *G06Q 10/08* | (2012.01) |
| *G09F 3/00* | (2006.01) |
| *G09F 23/00* | (2006.01) |
| *G06Q 30/06* | (2012.01) |
| *B65B 61/20* | (2006.01) |
| *B65C 9/00* | (2006.01) |
| *G06K 15/02* | (2006.01) |
| *G06Q 30/08* | (2012.01) |
| *G06N 5/04* | (2006.01) |
| *G06N 7/00* | (2006.01) |

(52) U.S. Cl.
CPC ........ *G06Q 30/0261* (2013.01); *B65B 61/20* (2013.01); *B65C 9/00* (2013.01); *G06Q 10/0832* (2013.01); *G06Q 10/0838* (2013.01); *G06Q 30/0251* (2013.01); *G06Q 30/0269* (2013.01); *G06Q 30/0277* (2013.01); *G06Q 30/0641* (2013.01); *G09F 3/00* (2013.01); *G09F 23/00* (2013.01); *G06K 15/024* (2013.01); *G06N 5/04* (2013.01); *G06N 7/005* (2013.01); *G06Q 30/08* (2013.01); *G09F 2023/0025* (2013.01)

(58) Field of Classification Search
None
See application file for complete search history.

(56) References Cited

U.S. PATENT DOCUMENTS

| | | | | |
|---|---|---|---|---|
| 5,046,299 | A * | 9/1991 | Hansen | G09F 19/00 53/411 |
| 8,376,345 | B1 * | 2/2013 | Haydt, III | B26D 1/205 270/52.17 |
| 8,744,910 | B2 * | 6/2014 | Ho | G06Q 30/0269 705/14.53 |
| 10,417,669 | B2 * | 9/2019 | Ho | G06F 16/283 |
| 2003/0160097 | A1 * | 8/2003 | Steiner | G06Q 30/02 235/385 |
| 2004/0122733 | A1 * | 6/2004 | Hanschen | G06Q 30/0251 705/14.23 |
| 2008/0010137 | A1 * | 1/2008 | Ho | G06Q 30/0274 705/14.66 |
| 2013/0043261 | A1 * | 2/2013 | Barton | B65D 81/3876 220/720 |
| 2013/0346156 | A1 * | 12/2013 | Ho | G06F 16/283 705/7.33 |

(Continued)

FOREIGN PATENT DOCUMENTS

WO    WO-8807970 A1 * 10/1988    ............. B42D 15/00

OTHER PUBLICATIONS

Anon., "'Zairmail' letters free, but are sent with ads," Record [Kitchener, Ontario], Final Edition, p. B05. Mar. 19, 2001. (Year: 2001).*

(Continued)

*Primary Examiner* — Nicholas D Rosen
(74) *Attorney, Agent, or Firm* — Cygnet IP Law, P.A.; Stephen W. Aycock, II (57) ABSTRACT

Computer-implemented parcel advertising methods, systems, and computer-readable media are described.

20 Claims, 5 Drawing Sheets

(56) References Cited

U.S. PATENT DOCUMENTS

2014/0104626 A1* 4/2014 Giordano .............. G09F 3/0288
  358/1.6
2014/0249932 A1* 9/2014 Gilliam .............. G06Q 30/0251
  705/14.66
2018/0134906 A1* 5/2018 Soma ....................... B41M 5/00

OTHER PUBLICATIONS

Anon., "UnDigital Unveils Industry's First Package Insert Marketplace: Marketplace Empowers Retailers to Monetize Packages at Scale While Arming Advertisers with New, Highly Effective Channel for Awareness and Sales," PR Newswire [New York], Jul. 24, 2018. (Year: 2018).*

* cited by examiner

PARCEL ADVERTISING

FIELD

Some implementations are generally related to advertising systems, and, more particularly, to parcel advertising systems and methods.

BACKGROUND

With the prevalence of ecommerce, the number of parcels being shipped to customers is substantial and increasing. Each parcel represents an opportunity for an advertiser or other entity to put advertising or informational messages in front the customer receiving the parcel.

The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

SUMMARY

Some implementations can include a computer-implemented method to control or perform parcel advertising functions. The method can include receiving, at one or more processors of a parcel advertising system, advertising information from an advertiser system, including an advertisement. The method can also include receiving, at the one or more processors, parcel shipment information from one of an ecommerce system or parcel shipment system, where the parcel shipment information is associated with a parcel. The method can further include matching, using the one or more processors, the advertisement with the parcel based on the advertising information and the parcel shipment information, and causing one of a label or an insert to be printed with the advertisement.

In some implementations, the advertisement includes an information message. In some implementations, the advertising information includes one or more of advertisement content, target information, advertisement frequency, or advertisement type. In some implementations, the parcel shipment information includes parcel destination, customer information, or parcel content information.

In some implementations, the matching includes matching based on one or more aspects of the advertising information and one or more aspects of the parcel shipment information. The method can also include causing both a label and an insert to be printed and applied to the parcel and inserted within the parcel, respectively. In some implementations, the label is a first advertisement and the insert is a second advertisement.

Some implementations can include a system having one or more processors coupled to a computer-readable medium having stored thereon software instructions that, when executed by the one or more processors, cause the one or more processors to perform operations. The operations can include receiving, at the one or more processors of a parcel advertising system, advertising information from an advertiser system, including an advertisement. The operations can also include receiving, at the one or more processors, parcel shipment information from one of an ecommerce system or parcel shipment system, where the parcel shipment information is associated with a parcel. The operations can further include matching, using the one or more processors, the advertisement with the parcel based on the advertising information and the parcel shipment information, and causing one of a label or an insert to be printed with the advertisement.

In some implementations, the advertisement includes an information message. In some implementations, the advertising information includes one or more of advertisement content, target information, advertisement frequency, or advertisement type. In some implementations, the parcel shipment information includes parcel destination, customer information, or parcel content information.

In some implementations, the matching includes matching based on one or more aspects of the advertising information and one or more aspects of the parcel shipment information. In some implementations, the operations further include causing both a label and an insert to be printed and applied to the parcel and inserted within the parcel, respectively. In some implementations, the label is a first advertisement and the insert is a second advertisement, different from the first advertisement.

Some implementations can include a computer-readable medium having stored thereon software instructions that, when executed by one or more processors, cause the one or more processors to perform operations. The operations can include receiving, at the one or more processors of a parcel advertising system, advertising information from an advertiser system, including an advertisement. The operations can also include receiving, at the one or more processors, parcel shipment information from one of an ecommerce system or parcel shipment system, where the parcel shipment information is associated with a parcel. The operations can further include matching, using the one or more processors, the advertisement with the parcel based on the advertising information and the parcel shipment information, and causing one of a label or an insert to be printed with the advertisement.

In some implementations, the advertisement includes an information message. In some implementations, the advertising information includes one or more of advertisement content, target information, advertisement frequency, or advertisement type. In some implementations, the parcel shipment information includes parcel destination, customer information, or parcel content information.

In some implementations, the matching includes matching based on one or more aspects of the advertising information and one or more aspects of the parcel shipment information. In some implementations, the operations further include causing both a label and an insert to be printed and applied to the parcel and inserted within the parcel, respectively. In some implementations, the label is a first advertisement and the insert is a second advertisement, different from the first advertisement.

DETAILED DESCRIPTION

Some implementations include parcel advertising methods and systems.

When performing parcel advertising functions, it may be helpful for a system to suggest a match between an advertisement and a parcel and/or to make predictions about which advertisements may be effective (e.g., generate a given response) with which corresponding parcels being shipped. To make predictions or suggestions, a probabilistic model (or other model as described below in conjunction with FIG. 4) can be used to make an inference (or prediction) about aspects of parcel advertising such as matching advertisements with given parcels for shipment based on one or more of recipient, parcel contents, etc. Accordingly, it may be helpful to make an inference regarding a probability that a given advertisement matched with a given parcel may result in a desired response (e.g., inquiry, order, etc.). Other aspects can be predicted or suggested as described below.

The inference based on the probabilistic model can include predicting an advertisement match with a parcel in accordance with parcel contents, customer information, and/or (or other data) as inferred from the probabilistic model. The probabilistic model can be trained with data including previous customer purchase data. Some implementations can include generating predictions of advertisement and parcel matches based on parcel contents or customer information (e.g., past purchases, current purchases, billing address, shipping address, etc.).

The systems and methods provided herein may overcome one or more deficiencies of some conventional advertising systems and methods. For example, some conventional parcel advertising systems and methods may simply place the same or a similar advertisement on or in outgoing packages without consideration of parcel contents or customer information.

The example systems and methods described herein may overcome one or more of the deficiencies of conventional parcel advertising systems to provide users with automated individualized matching of advertisement with parcels. A technical problem of some conventional parcel advertising systems may be that such systems do not suggest individualized advertisement matches for a particular parcel and/or predict advertising and parcel matches to optimize response rates to the advertisements.

Particular implementations may realize one or more of the following advantages. An advantage of advertisement relevance and/or advertising response rate improvement based on methods and system described herein is that the suggestions are based on parcel and/or customer data and predicted advertisement-parcel matching confidence. Yet another advantage is that the methods and systems described herein can dynamically learn new thresholds (e.g., for confidence scores, etc.) and provide suggestions for parcel-advertisement matches that meet the new thresholds. The systems and methods presented herein automatically provide parcel advertising suggestions that are more likely to be responded to by customers and that likely are more accurate.

Figure 1:
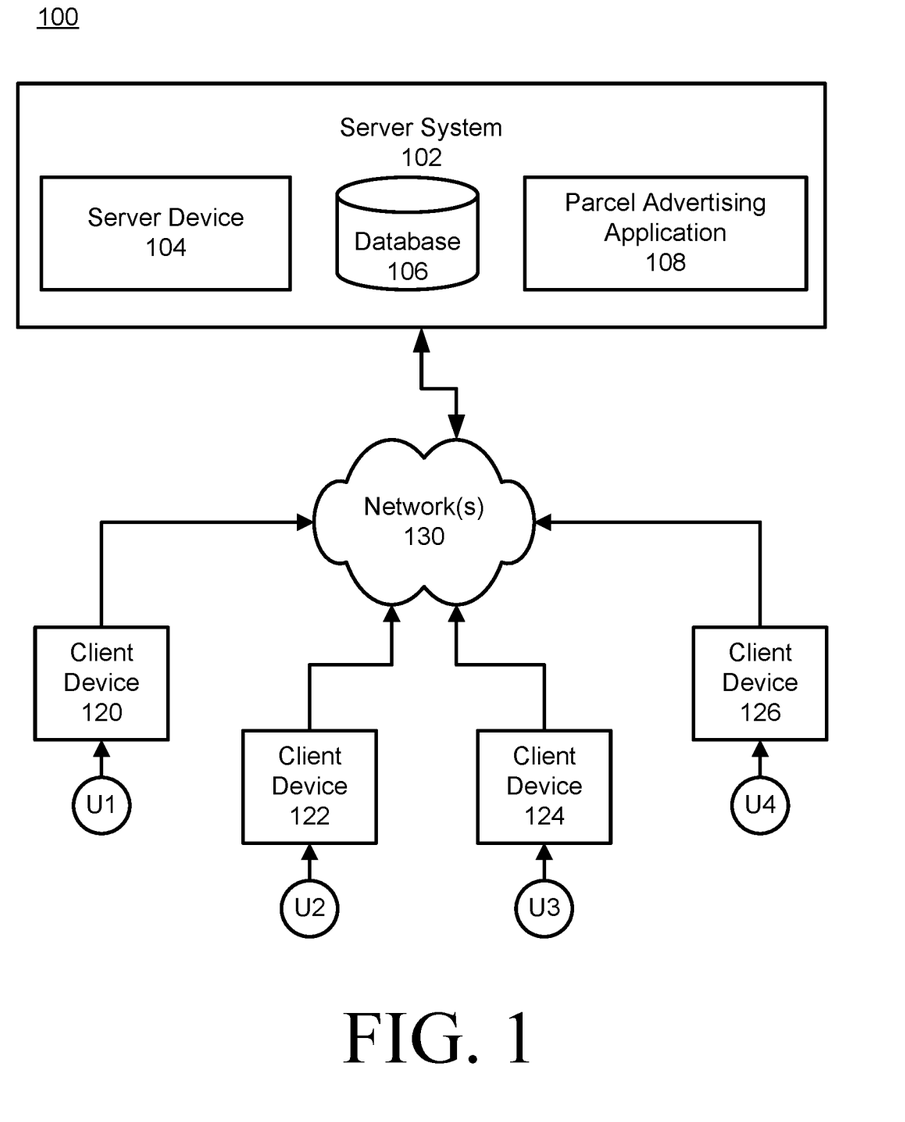
FIG. 1 is a block diagram of an example system and a network environment which may be used for one or more implementations described herein.

FIG. 1 illustrates a block diagram of an example network environment 100, which may be used in some implementations described herein. In some implementations, network environment 100 includes one or more server systems, e.g., server system 102 in the example of FIG. 1A. Server system 102 can communicate with a network 130, for example. Server system 102 can include a server device 104, a database 106 or other data store or data storage device, and a parcel advertising application 108. Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch, or hub connections, etc. In some implementations, network 130 can include peer-to-peer communication 132 between devices, e.g., using peer-to-peer wireless protocols.

For ease of illustration, FIG. 1 shows one block for server system 102, server device 104, and database 106, and shows four blocks for client devices 120, 122, 124, and 126. Some blocks (e.g., 102, 104, and 106) may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., desktop computer, laptop computer, portable or mobile device, camera, cell phone, smart phone, tablet computer, television, TV set top box or entertainment device, wearable devices (e.g., display glasses or goggles, head-mounted display (HMD), wristwatch, headset, armband, jewelry, etc.), virtual reality (VR) and/or augmented reality (AR) enabled devices, personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102, and/or via a network service, e.g., an image sharing service, a messaging service, a social network service or other type of network service, implemented on server system 102. For example, respective client devices 120, 122, 124, and 126 may communicate data to and from one or more server systems (e.g., server system 102). In some implementations, the server system 102 may provide appropriate data to the client devices such that each client device can receive communicated content or shared content uploaded to the server system 102 and/or network service. In some examples, the users can interact via audio or video conferencing, audio, video, or text chat, or other communication modes or applications. In some examples, the network service can include any system allowing users to perform a variety of communications, form links and associations, upload and post advertising or informational content such as images, image compositions (e.g., albums that include one or more images, image collages, videos, etc.), audio data, and other types of content, receive various forms of data, and/or perform advertising-related functions. For example, the network service can allow a user to send messages to particular or multiple other users, form social links in the form of associations to other users within the network service, group other users in user lists, friends lists, or other user groups, post or send content including text, images, image compositions, audio sequences or recordings, or other types of content for access by designated sets of users of the network service, participate in live video, audio, and/or text videoconferences or chat with other users of the service, etc. In some implementations, a "user" can include one or more programs or virtual entities, as well as persons that interface with the system or network.

A user interface can enable display of advertisements, information messages, data, and other content as well as communications, privacy settings, notifications, and other data on client devices 120, 122, 124, and 126 (or alternatively on server system 102). Such an interface can be displayed using software on the client device, software on the server device, and/or a combination of client software and server software executing on server device 104, e.g., application software or client software in communication with server system 102. The user interface can be displayed by a display device of a client device or server device, e.g., a display screen, projector, etc. In some implementations, application programs running on a server system can communicate with a client device to receive user input at the client device and to output data such as visual data, audio data, etc. at the client device.

In some implementations, server system 102 and/or one or more client devices 120-126 can provide a parcel advertising system.

Various implementations of features described herein can use any type of system and/or service. Any type of electronic device can make use of features described herein. Some implementations can provide one or more features described herein on client or server devices disconnected from or intermittently connected to computer networks.

Figure 2:
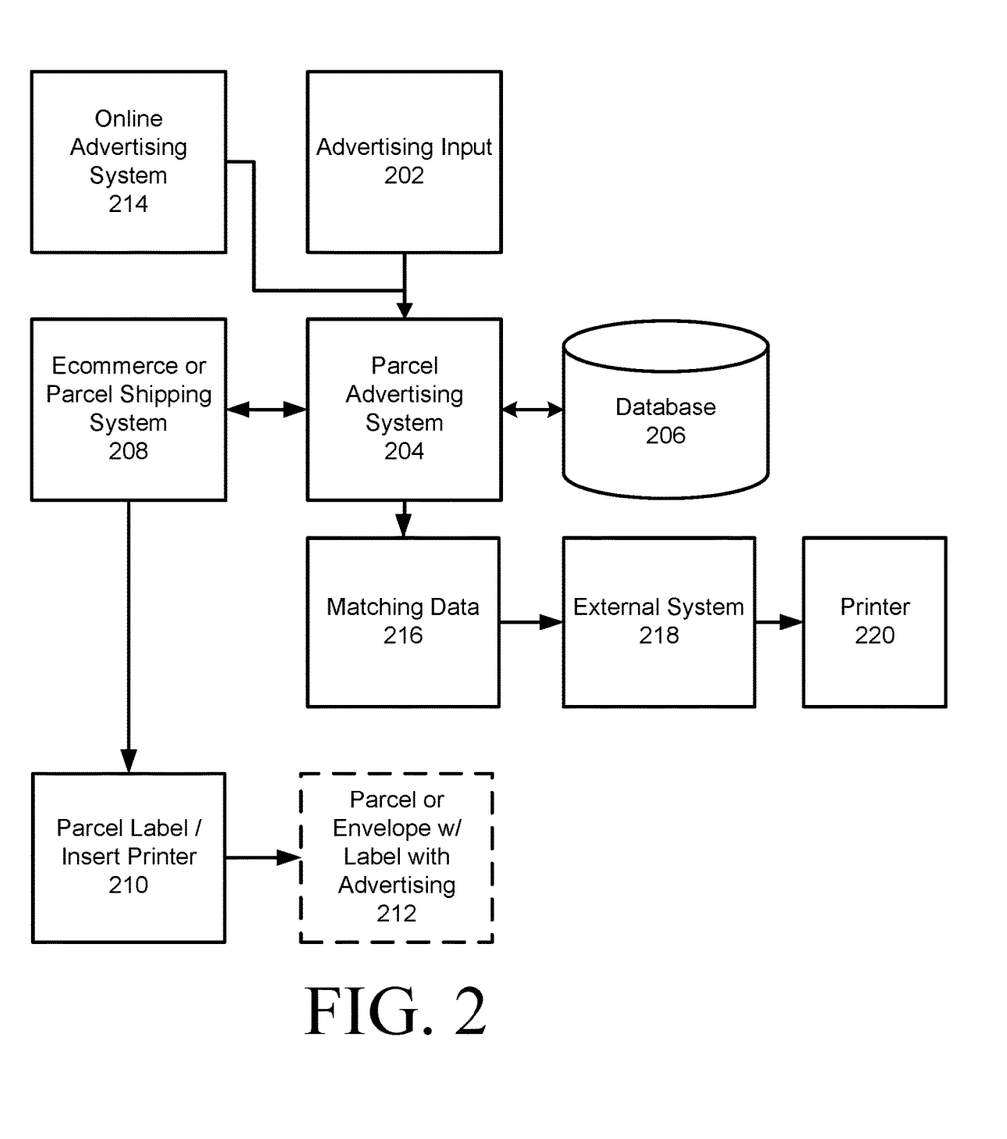
FIG. 2 is a diagram of a parcel advertising system in accordance with some implementations.

FIG. 2 is a diagram of a parcel advertising system in accordance with some implementations. In particular, FIG. 2 shows advertising input 202, a parcel advertising system 204, a database 206, an ecommerce or parcel shipping system 208, a parcel labeling, box or envelope printing system, and/or insert printing system 210, and a parcel 212. FIG. 2 also shows an online advertising system 214, matching data 216, an external system 218, and a printer 220.

In operation, advertising input 202 is provided to the parcel advertising system 204. For example, an advertiser client system can provide advertising data including one or more of advertisement content, target information (e.g., target customer demographics, target products, target competitor products, etc.), advertisement frequency, advertisement type (e.g., a printed label applied to a parcel, a printed box or envelope, and/or an insert placed into parcel, or two or more of the above), etc. The parcel advertising system 204 can store the advertising input 202 in the database 206.

The parcel advertising system 204 can receive information from the ecommerce or parcel shipping system 208 such as parcel destination, customer information (location, demographics (such as age, gender, income, education, hobbies, interests, or the like), previous purchases, etc.), parcel content information (e.g., items contained in parcel), etc. Using the information received from the ecommerce or parcel shipping system 208 and the advertising input 202, the parcel advertising system 204 performs a matching process to match an advertisement or informational content with a given parcel. The matching can be performed in a parcel shipment planning phase prior to the parcel being actually packed and prepared for shipment. Once the matching has been performed, the parcel advertising system 204 can cause the advertisement to be printed by sending the matching advertisement information to the ecommerce or parcel shipping system 208, which, in turn, can then cause a label, packaging (e.g., box or envelope), or insert to be printed on printer 210 and applied to the outside of a parcel 212 (or inserted within the parcel 212). In some implementations, packing material used within a box or envelope could be printed with an advertisement or information.

The parcel advertising system can be a standalone system or can be integrated with an ecommerce system or a parcel shipping system. In some implementations, the advertiser is a different entity than the shipper. In some implementations, the advertiser is the same entity as the shipper.

In some implementations, the parcel advertising system 204 can exchange information with the online advertising system 214. The online advertising system 214 can include advertiser information, advertisement information and information on matching advertisements to keywords, products, product types, geographic locations, etc. The online advertising system 214 can be an internal system (e.g., part of the computing infrastructure including the parcel advertising system 204) or an external system (e.g., a system outside the infrastructure of the parcel advertising system 204 or operated by a different entity). The online advertising system 214 can include a search engine advertising system, a display advertising system, a review or recommendation service advertising system, or the like. The online advertising system can be configured to receive parcel or customer information from the parcel advertising system and to provide an advertising signal including a matched advertisement from among the advertisements in the online advertising system 214.

The exchange of information between the online advertising system 214 and the parcel advertising system 204 can provide the parcel advertising system with more advertisements to be matched against parcels and can provide the online advertising system 214 with a different advertising medium (the parcel) that can be made available to the advertisers on the online advertising system as an add-on service for the online advertisers.

In some implementations, the parcel advertising system 204 can provide matching data 216, which could be made anonymous by including only address, product types, products, etc., on an external system 218 to permit the external system 218 to print mailers using a printer 220. The mailers can be sent to recipients based on the matching data from the parcel advertising system 204 and data in the external system 218. For example, geographic location and product information from the parcel advertising system 204 can be used to identify mailing advertisers. The mailing advertisers can target individual addresses, routes, zones, zip codes, etc. with a mailing piece advertisement without having access to the personally identifiable information of the parcel recipients. For example, for a given city and product purchase of swimming pool toys, a pool service mailing advertiser in the external system 218 could select to send a swimming pool service advertisement to any homes (or routes, etc.) within a selected area that receive a parcel with swimming pool related items.

Figure 3:
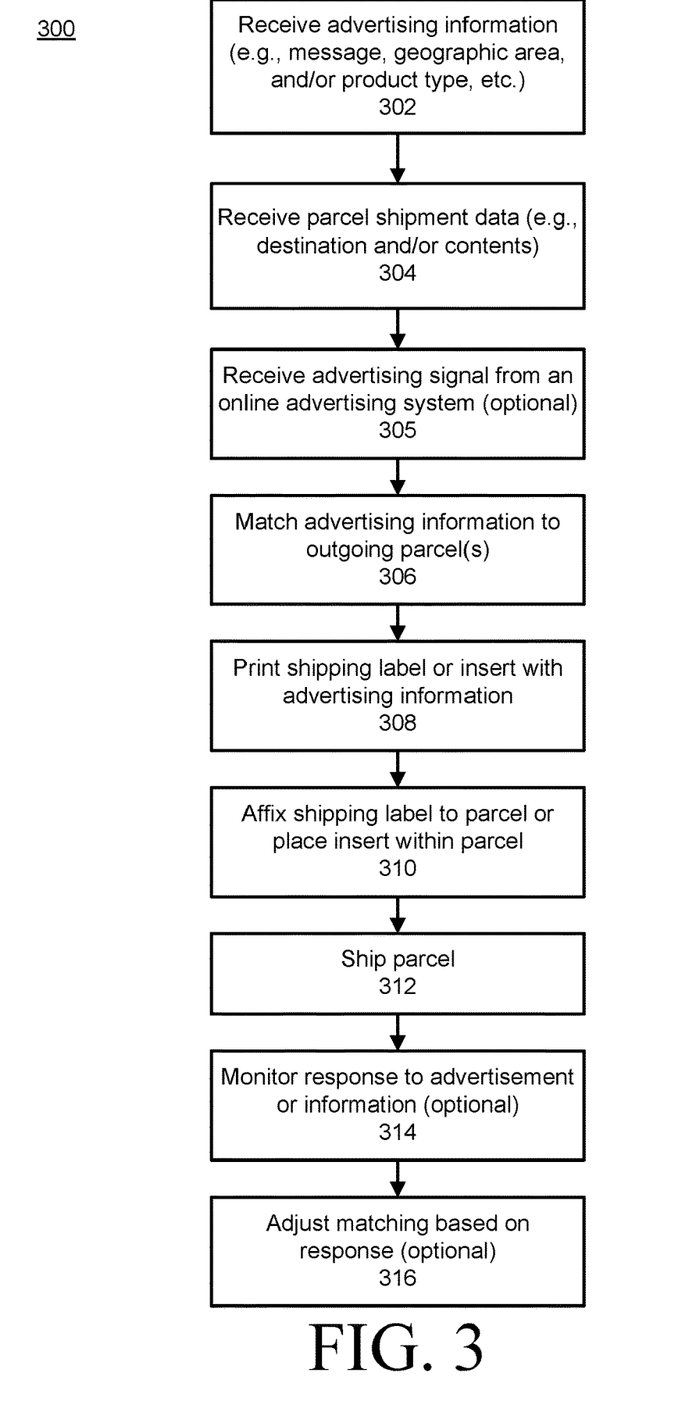
FIG. 3 is a flowchart showing an example method of parcel advertising in accordance with some implementations.

FIG. 3 is a flowchart showing an example method 300 to perform parcel advertising in accordance with some implementations. Method 300 may be performed by processing logic that includes hardware (e.g., circuitry, dedicated logic, programmable logic, microcode), software (e.g., instructions run on a processing device to perform hardware simulation), or a combination thereof. In some implementations, the parcel advertising application 108 executing at the server system 102 may perform some or all the operations. In other implementations, a client device (e.g., 120-126), server 102 or combination thereof may perform some or all the operations. It may be noted that the in some implementations, method 300 may include the same, different, fewer, or a greater number of operations performed in any order.

Processing begins at 302, where advertising information is received. For example, advertising information such as advertisement message content images and/or text, geographic area, frequency, target products or product types, target recipient demographics, etc. Advertising information can also include a frequency of advertising, a time of month or year for advertising (e.g., for seasonal sales, etc.). The advertising information can be received at a parcel advertising system from an advertiser system. Processing continues to 304.

At 304, parcel shipment data is received. For example, parcel shipment data from an ecommerce or parcel shipment system is received at a parcel advertising system. The parcel information can include the information described above. Parcel shipment data can include a parcel shipment plan (e.g., items planned for a parcel and a destination address for a parcel). Processing continues to 305.

At 305, an advertising signal from an existing online advertising system (e.g., 214) is optionally received. The advertising signal from an existing online advertising system can be used to make a match between the same or a different advertisement and a parcel for applying to or inserting the advertisement or information into the matched parcel as described below. Processing continues to 306.

At 306, advertisements are matched with parcels. For example, the parcel advertising system can use the advertising information and the parcel information to match an advertisement to a given parcel. For example, Company A may want to provide a coupon advertisement to any customer who are receiving a parcel containing one of Company A's products. In another example, Company A may wish to advertise on or in parcels that contain a product from Company B, a competitor of Company A. The advertisements can be matched based on one or more information features such as geographic location, customer demographics, customer shopping history, and/or parcel contents. An advertiser can target one or more of one or more geographic areas, one or more customer demographic attributes, one or more products within a parcel, etc. An advertiser can target a combination of information features or attributes such as a combination of one or more products or product types and one or more geographic locations. The advertising system could use the advertising signal from an existing online advertising system to make a match between the same or a different advertisement and a parcel for applying to or inserting the advertisement or information into the matched parcel. Other information besides parcel information can be used for matching such as advertising frequency, day of month, day of year, season, upcoming holiday(s), etc. Once the match is made, processing continues to 308.

At 308, a label or insert for a parcel is printed with the advertising message matched to that parcel in 306. For example, a shipping label printer or insert printer can be used to print the label or insert. Processing continues to 310.

At 310, the label is affixed to the parcel or the insert in placed within the parcel. Processing continues to 312.

At 312, the parcel with the label or insert is shipped to a destination address. Processing continues to 314.

At 314, the system can optionally monitor response to an advertisement or informational piece by, for example, tracking utilized coupons codes or other offers, or otherwise tracking response. Processing continues to 316.

At 316, the system can adjust the matching process or parameters based on the response monitored in 314. For example, the system can use response information to adjust a machine learning model as described below. In another example, the system could provide suggestions to make manual changes to a parcel advertising campaign (e.g., making changes in the products or customers being targeted). In some implementations, the parcel advertising system can also perform steps to connect with and transmit data to an external system as described below in connection with FIG. 5.

In some implementations, both a label and an insert can be matched and applied/inserted to the parcel. The label and the insert can be from the same or difference advertisers.

Figure 4:
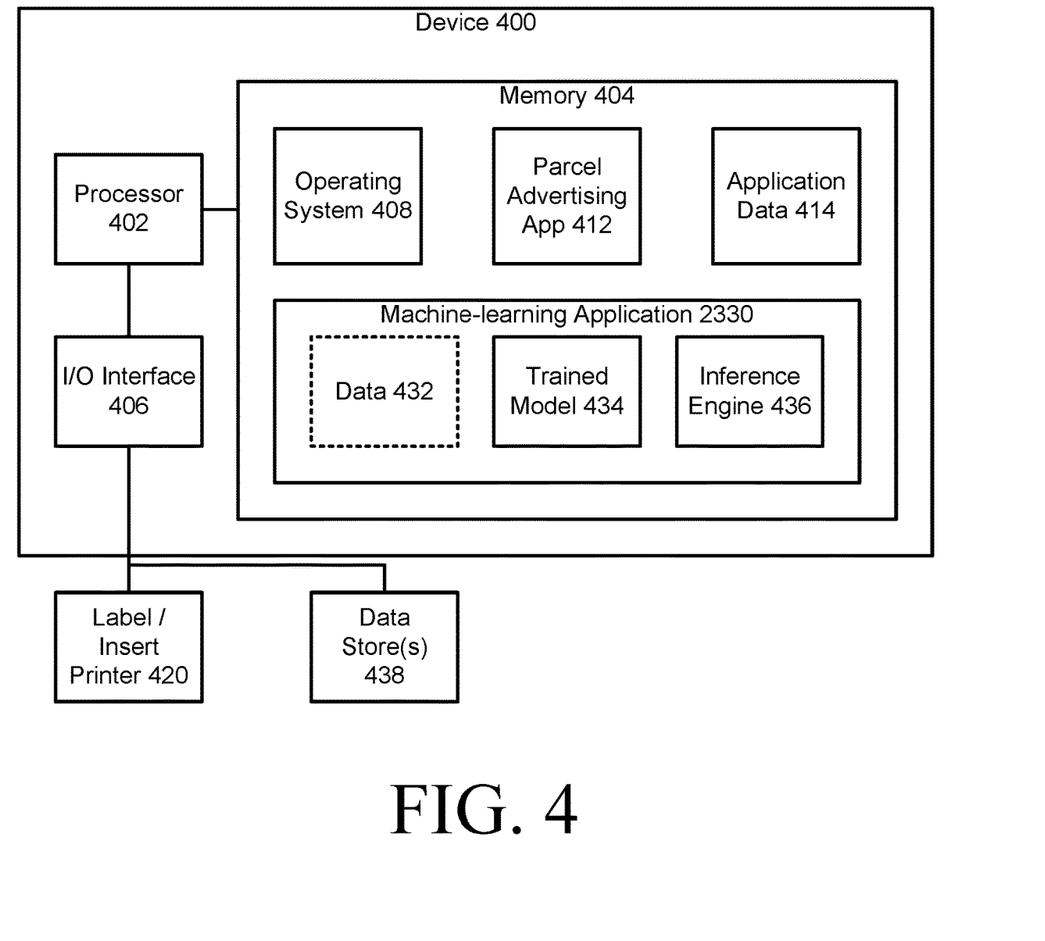
FIG. 4 is a block diagram of an example computing device which may be used for one or more implementations described herein.

FIG. 4 is a block diagram of an example device 400 which may be used to implement one or more features described herein. In one example, device 400 may be used to implement a client device, e.g., any of client devices 120-126 shown in FIG. 1. Alternatively, device 400 can implement a server device, e.g., server device 104, etc. In some implementations, device 400 may be used to implement a client device, a server device, or a combination of the above. Device 400 can be any suitable computer system, server, or other electronic or hardware device as described above.

One or more methods described herein (e.g., 300) can be run in a standalone program that can be executed on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, head mounted display, etc.), laptop computer, etc.).

In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 400 includes a processor 402, a memory 404, and I/O interface 406. Processor 402 can be one or more processors and/or processing circuits to execute program code and control basic operations of the device 400. A "processor" includes any suitable hardware system, mechanism or component that processes data, signals, or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems.

In some implementations, processor 402 may include one or more co-processors that implement neural-network processing. In some implementations, processor 402 may be a processor that processes data to produce probabilistic output, e.g., the output produced by processor 402 may be imprecise or may be accurate within a range from an expected output. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 404 is typically provided in device 400 for access by the processor 402, and may be any suitable processor-readable storage medium, such as random access memory (RAM), read-only memory (ROM), Electrically Erasable Read-only Memory (EEPROM), Flash memory, etc., suitable for storing instructions for execution by the processor, and located separate from processor 402 and/or integrated therewith. Memory 404 can store software operating on the server device 400 by the processor 402, including an operating system 408, machine-learning application 430, parcel advertising application 412, and application data 414. Other applications may include applications such as a data display engine, web hosting engine, image display engine, notification engine, social networking engine, etc. In some implementations, the machine-learning application 430 and parcel advertising application 412 can each include instructions that enable processor 402 to perform functions described herein, e.g., some or all of the method of FIG. 3 or 5.

The machine-learning application 430 can include one or more NER implementations for which supervised and/or unsupervised learning can be used. The machine learning models can include multi-task learning based models, residual task bidirectional LSTM (long short-term memory) with conditional random fields, statistical NER, etc. The Device can also include a parcel advertising application 412 as described herein and other applications. One or more methods disclosed herein can operate in several environments and platforms, e.g., as a standalone computer program that can run on any type of computing device, as a web application having web pages, as a mobile application ("app") run on a mobile computing device, etc.

In various implementations, machine-learning application 430 may utilize Bayesian classifiers, support vector machines, neural networks, or other learning techniques. In some implementations, machine-learning application 430 may include a trained model 434, an inference engine 436, and data 432. In some implementations, data 432 may include training data, e.g., data used to generate trained model 434. For example, training data may include any type of data suitable for training a model for parcel advertising functions as described herein (e.g., FIG. 3 or 5), such as parcel contents information, customer information, thresholds, etc. associated with parcel advertising as described herein. Training data may be obtained from any source, e.g., a data repository specifically marked for training, data for which permission is provided for use as training data for machine-learning, etc. In implementations where one or more users permit use of their respective user data to train a machine-learning model, e.g., trained model 434, training data may include such user data. In implementations where users permit use of their respective user data, data 432 may include permitted data.

In some implementations, data 432 may include collected data such as customer prior purchases. In some implementations, training data may include synthetic data generated for the purpose of training, such as data that is not based on user input or activity in the context that is being trained, e.g., data generated from simulated transactions, simulated advertising, simulated advertising response, etc. In some implementations, machine-learning application 430 excludes data 432. For example, in these implementations, the trained model 434 may be generated, e.g., on a different device, and be provided as part of machine-learning application 430. In various implementations, the trained model 434 may be provided as a data file that includes a model structure or form, and associated weights. Inference engine 436 may read the data file for trained model 434 and implement a neural network with node connectivity, layers, and weights based on the model structure or form specified in trained model 434.

Machine-learning application 430 also includes a trained model 434. In some implementations, the trained model 434 may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc.

The model form or structure may specify connectivity between various nodes and organization of nodes into layers. For example, nodes of a first layer (e.g., input layer) may receive data as input data 432 or application data 414. Such data can include, for example, parcel contents and available advertisements (including advertisement data such as target demographic, etc.) to select from, e.g., when the trained model is used for parcel advertising functions. Subsequent intermediate layers may receive as input output of nodes of a previous layer per the connectivity specified in the model form or structure. These layers may also be referred to as hidden layers. A final layer (e.g., output layer) produces an output of the machine-learning application. For example, the output may be an advertisement matched to a given parcel depending on the specific trained model. In some implementations, model form or structure also specifies a number and/or type of nodes in each layer.

In different implementations, the trained model 434 can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output.

In some implementations, the computation performed by a node may also include applying a step/activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech, or other audio, etc.

In some implementations, trained model 434 may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using data 432, to produce a result.

For example, training may include applying supervised learning techniques. In supervised learning, the training data can include a plurality of inputs (e.g., advertising and parcel information) and a corresponding expected output for each input (e.g., a matched advertisement). Based on a comparison of the output of the model with the expected output, values of the weights are automatically adjusted, e.g., in a manner that increases a probability that the model produces the expected output when provided similar input.

In some implementations, training may include applying unsupervised learning techniques. In unsupervised learning, only input data may be provided, and the model may be trained to differentiate data, e.g., to cluster input data into a plurality of groups, where each group includes input data that are similar in some manner. For example, the model may be trained to identify advertisements that are associated with parcels and/or select thresholds for parcel advertising recommendation.

In another example, a model trained using unsupervised learning may cluster words based on the use of the words in data sources. In some implementations, unsupervised learning may be used to produce knowledge representations, e.g., that may be used by machine-learning application 430. In various implementations, a trained model includes a set of weights, or embeddings, corresponding to the model structure. In implementations where data 432 is omitted, machine-learning application 430 may include trained model 434 that is based on prior training, e.g., by a developer of the machine-learning application 430, by a third-party, etc. In some implementations, trained model 434 may include a set of weights that are fixed, e.g., downloaded from a server that provides the weights.

Machine-learning application 430 also includes an inference engine 436. Inference engine 436 is configured to apply the trained model 434 to data, such as application data 414, to provide an inference. In some implementations, inference engine 436 may include software code to be executed by processor 402. In some implementations, inference engine 436 may specify circuit configuration (e.g., for a programmable processor, for a field programmable gate array (FPGA), etc.) enabling processor 402 to apply the trained model. In some implementations, inference engine 436 may include software instructions, hardware instructions, or a combination. In some implementations, inference engine 436 may offer an application programming interface (API) that can be used by operating system 408 and/or parcel advertising application 412 to invoke inference engine 436, e.g., to apply trained model 434 to application data 414 to generate an inference.

Machine-learning application 430 may provide several technical advantages. For example, when trained model 434 is generated based on unsupervised learning, trained model 434 can be applied by inference engine 436 to produce knowledge representations (e.g., numeric representations) from input data, e.g., application data 414. For example, a model trained for parcel advertising tasks may produce predictions and confidences for given input information about matching an advertisement to a parcel. A model trained for suggesting parcel-advertisement matches may produce a suggestion for one or more advertisement and parcel matches. In some implementations, such representations may be helpful to reduce processing cost (e.g., computational cost, memory usage, etc.) to generate an output (e.g., a suggestion, a prediction, a classification, etc.). In some implementations, such representations may be provided as input to a different machine-learning application that produces output from the output of inference engine 436.

In some implementations, knowledge representations generated by machine-learning application 430 may be provided to a different device that conducts further processing, e.g., over a network. In such implementations, providing the knowledge representations rather than the images may provide a technical benefit, e.g., enable faster data transmission with reduced cost. In another example, a model trained for parcel advertising matching may produce a match signal for one or more advertisements and/or parcels being processed by the model.

In some implementations, machine-learning application 430 may be implemented in an offline manner. In these implementations, trained model 434 may be generated in a first stage and provided as part of machine-learning application 430. In some implementations, machine-learning application 430 may be implemented in an online manner. For example, in such implementations, an application that invokes machine-learning application 430 (e.g., operating system 408, one or more of parcel advertising application 412 or other applications) may utilize an inference produced by machine-learning application 430, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update trained model 434, e.g., to update embeddings for trained model 434.

In some implementations, machine-learning application 430 may be implemented in a manner that can adapt to particular configuration of device 400 on which the machine-learning application 430 is executed. For example, machine-learning application 430 may determine a computational graph that utilizes available computational resources, e.g., processor 402. For example, if machine-learning application 430 is implemented as a distributed application on multiple devices, machine-learning application 430 may determine computations to be carried out on individual devices in a manner that optimizes computation. In another example, machine-learning application 430 may determine that processor 402 includes a GPU with a particular number of GPU cores (e.g., 1000) and implement the inference engine accordingly (e.g., as 1000 individual processes or threads).

In some implementations, machine-learning application 430 may implement an ensemble of trained models. For example, trained model 434 may include a plurality of trained models that are each applicable to same input data. In these implementations, machine-learning application 430 may choose a particular trained model, e.g., based on available computational resources, success rate with prior inferences, etc. In some implementations, machine-learning application 430 may execute inference engine 436 such that a plurality of trained models is applied. In these implementations, machine-learning application 430 may combine outputs from applying individual models, e.g., using a voting-technique that scores individual outputs from applying each trained model, or by choosing one or more particular outputs. Further, in these implementations, machine-learning application may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the machine-learning application, e.g., by operating system 408 or one or more other applications, e.g., parcel advertising application 412.

In different implementations, machine-learning application 430 can produce different types of outputs. For example, machine-learning application 430 can provide representations or clusters (e.g., numeric representations of input data), labels (e.g., for input data that includes images, documents, etc.), phrases or sentences (e.g., descriptive of an image or video, suitable for use as a response to an input sentence, suitable for use to determine context during a conversation, etc.), images (e.g., generated by the machine-learning application in response to input), audio or video (e.g., in response an input video, machine-learning application 430 may produce an output video with a particular effect applied, e.g., rendered in a comic-book or particular artist's style, when trained model 434 is trained using training data from the comic book or particular artist, etc. In some implementations, machine-learning application 430 may produce an output based on a format specified by an invoking application, e.g. operating system 408 or one or more applications, e.g., parcel advertising application 412. In some implementations, an invoking application may be another machine-learning application. For example, such configurations may be used in generative adversarial networks, where an invoking machine-learning application is trained using output from machine-learning application 430 and vice-versa.

Any of software in memory 404 can alternatively be stored on any other suitable storage location or computer-readable medium. In addition, memory 404 (and/or other connected storage device(s)) can store one or more messages, one or more taxonomies, electronic encyclopedia, dictionaries, thesauruses, knowledge bases, message data, grammars, user preferences, and/or other instructions and data used in the features described herein. Memory 404 and any other type of storage (magnetic disk, optical disk, magnetic tape, or other tangible media) can be considered "storage" or "storage devices."

I/O interface 406 can provide functions to enable interfacing the server device 400 with other systems and devices. Interfaced devices can be included as part of the device 400 or can be separate and communicate with the device 400. For example, network communication devices, storage devices (e.g., memory and/or database 106), and input/output devices can communicate via I/O interface 406. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to I/O interface 406 can include one or more parcel label, box/envelope, or insert printers 420 and one or more data stores 438 (as discussed above). The printer(s) 420 can be used to print parcel advertisement labels, boxes/envelopes, or inserts as described herein.

The I/O interface 406 can interface to other input and output devices. Some examples include one or more cameras which can capture images. Some implementations can provide a microphone for capturing sound (e.g., as a part of captured images, voice commands, etc.), audio speaker devices for outputting sound, or other input and output devices.

For ease of illustration, FIG. 4 shows one block for each of processor 402, memory 404, I/O interface 406, and software blocks 408, 412, and 430. These blocks may represent one or more processors or processing circuitries, operating systems, memories, I/O interfaces, applications, and/or software modules. In other implementations, device 400 may not have all of the components shown and/or may have other elements including other types of elements instead of, or in addition to, those shown herein. While some components are described as performing blocks and operations as described in some implementations herein, any suitable component or combination of components of environment 100, device 400, similar systems, or any suitable processor or processors associated with such a system, may perform the blocks and operations described.

In some implementations, the parcel advertising system could include a machine-learning model (as described herein) for tuning the system (e.g., selecting parcel advertisement matches and corresponding thresholds) to potentially provide improved accuracy. Example machine-learning model input can include labels for a simple implementation and can be augmented with descriptor vector features for a more advanced implementation. Output of the machine-learning module can include a prediction of a match between an advertisement and a parcel.

Figure 5:
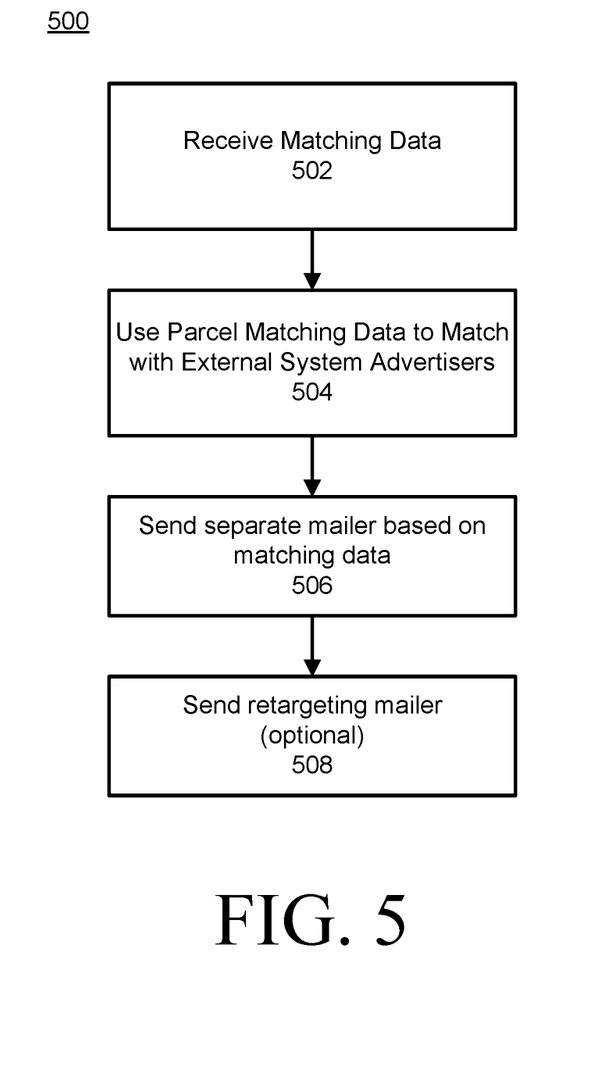
FIG. 5 is a flowchart showing an example method of using a matching signal from the parcel advertising system to send a separate mail piece in accordance with some implementations.

FIG. 5 is a flowchart showing an example method 500 of using a matching signal transmitted from the parcel advertising system to send a separate mail piece in accordance with some implementations. Processing begins at 502, where parcel advertising matching data is received. For example, matching data transmitted from a parcel advertising system (e.g., 204) can be received. The matching data can include one or more of name, address, product types, products, etc. Processing continues to 504.

At 504, the matching data from the parcel advertising system can be matched with one or more advertisers in an external system (e.g., 218) such as a physical mail advertising system. For example, the parcel advertising system matching data can be used to match external system advertisers by identifying product types or products associated with an advertiser and being associated with an address within the advertiser's selected area for advertising. For example, if the matching data indicates a customer in a given zip code ordered swimming pool accessories, then the external system could identify an advertiser such as a pool cleaning service to receive a physical advertising piece based on the match. Processing continues to 506.

At 506, a separate mailer is sent from the external system based on the matching data. Continuing with the example from 504, the external system could send a printed advertisement for pool services to the customer associated with the matching data that showed an order of swimming pool accessories going to an address within a given zip code. In some implementations, the advertiser associated with the external system (e.g., the pool service company) does not have access to and does not receive any of the matching information received at the external system from the parcel advertising system (e.g., the address, product type, products ordered, etc.). The matching information is maintained in the external system so as to maintain privacy of the parcel advertising system customers. In other implementations, the matching data could be made available in an aggregate form to the advertiser associated with the external system in a way that protects the privacy of the individual customers within the parcel advertising system (e.g., information that a certain number of households in a given zip code order certain products or types of products). Processing continues to 508.

At 508, a retargeting mailer is optionally sent based on the matching data. The retargeting mailer could be a mailer sent after a period of time has elapsed during which the address that received the mailer at 506 (e.g., for customers that have or have not purchased the advertised products or services).

One or more methods described herein (e.g., method 200) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks. Any suitable programming language and programming techniques may be used to implement the routines of particular implementations. Different programming techniques may be employed, e.g., procedural, or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method for automated individualized matching of advertisements with parcels, the method comprising:
    receiving, at one or more processors of a parcel advertising system, advertising information from an advertiser system, including one or more advertisements and target information including one or more of target customer demographics, target products, and target competitor products;
    receiving, at the one or more processors, parcel shipment information from one of an ecommerce system or parcel shipment system, where the parcel shipment information is associated with a parcel and includes parcel destination information and parcel content information;
    receiving, at the one or more processors of a parcel advertising system, an advertising signal from an online advertising system;
    matching, using the one or more processors, the one or more advertisements with the parcel based on an automated comparison of the advertising information, the target information, the advertising signal, and the parcel shipment information, wherein the one or more matched advertisements are automatically targeted for a recipient of the parcel based on at least the parcel content information;
    automatically printing the one or more matched advertisements via a printer coupled to the parcel shipment system, wherein the one or more matched advertisements are printed as one of a label to be applied to the parcel or an insert to be inserted into the parcel; and
    transmitting the one or more matched advertisements and the parcel shipment information from the matching to one or more external systems to facilitate generating of advertising pieces from the one or more external systems based on the matching.

2. The computer-implemented method of claim 1, wherein the one or more advertisements include an information message.

3. The computer-implemented method of claim 1, wherein the advertising information further includes one or more of advertisement content, advertisement frequency, or advertisement type.

4. The computer-implemented method of claim 1, wherein the parcel shipment information further includes customer information.

5. The computer-implemented method of claim 1, wherein the matching includes matching based on one or more aspects of the advertising information and one or more aspects of the parcel shipment information.

6. The computer-implemented method of claim 1, further comprising causing both a label and an insert to be printed and applied to the parcel and inserted within the parcel, respectively.

7. The computer-implemented method of claim 6, wherein the label is a first advertisement and the insert is a second advertisement.

8. A system for automated individualized matching of advertisements with parcels, the system comprising:
one or more processors coupled to a computer-readable medium having stored thereon software instructions that, when executed by the one or more processors, cause the one or more processors to perform operations including:
receiving, at the one or more processors of a parcel advertising system, advertising information from an advertiser system, including one or more advertisements and target information including one or more of target customer demographics, target products, and target competitor products;
receiving, at the one or more processors of a parcel advertising system, an advertising signal from an online advertising system;
receiving, at the one or more processors, parcel shipment information from one of an ecommerce system or parcel shipment system, where the parcel shipment information is associated with a parcel and includes parcel destination information and parcel content information;
matching, using the one or more processors, the one or more advertisements with the parcel based on an automated comparison of the advertising information, the target information, the advertising signal, and the parcel shipment information, wherein the one or more matched advertisements are automatically targeted for a recipient of the parcel based on at least the parcel content information;
automatically printing the one or more matched advertisements via a printer coupled to the parcel shipment system, wherein the one or more matched advertisements are printed as one of a label to be applied to the parcel or an insert to be inserted into the parcel; and
transmitting the one or more matched advertisements and the parcel shipment information to one or more external systems to facilitate automatically generating advertising pieces from the one or more external systems based on the matching.

9. The system of claim 8, wherein the one or more advertisements include an information message.

10. The system of claim 8, wherein the advertising information further includes one or more of advertisement content, advertisement frequency, or advertisement type.

11. The system of claim 8, wherein the parcel shipment information further includes customer information.

12. The system of claim 8, wherein the matching includes matching based on one or more aspects of the advertising information and one or more aspects of the parcel shipment information.

13. The system of claim 8, wherein the operations further include causing both a label and an insert to be printed and applied to the parcel and inserted within the parcel, respectively.

14. The system of claim 13, wherein the label is a first advertisement and the insert is a second advertisement, different from the first advertisement.

15. A non-transitory computer-readable medium having stored thereon software instructions that, when executed by one or more processors, cause the one or more processors to perform operations including:
receiving, at the one or more processors of a parcel advertising system, advertising information from an advertiser system, including one or more advertisements and target information including one or more of target customer demographics, target products, and target competitor products;
receiving, at the one or more processors of a parcel advertising system, an advertising signal from an online advertising system;
receiving, at the one or more processors, parcel shipment information from one of an ecommerce system or parcel shipment system, where the parcel shipment information is associated with a parcel and includes parcel destination information and parcel content information;
matching, using the one or more processors, the one or more advertisements with the parcel based on an automated comparison of the advertising information, the target information, the advertising signal, and the parcel shipment information, wherein the one or more matched advertisements are automatically targeted for a recipient of the parcel based on at least the parcel content information; and
automatically printing the one or more matched advertisements via a printer coupled to the parcel shipment system, wherein the one or more matched advertisements are printed as one of a label to be applied to the parcel or an insert to be inserted into the parcel; and
transmitting the one or more matched advertisements and the parcel shipment information from the matching to one or more external systems to facilitate automatically generating advertising pieces from the one or more external systems based on the matching.

16. The non-transitory computer-readable medium of claim 15, wherein the one or more advertisements includes an information message.

17. The non-transitory computer-readable medium of claim 15, wherein the advertising information further includes one or more of advertisement content, advertisement frequency, or advertisement type.

18. The non-transitory computer-readable medium of claim 15, wherein the parcel shipment information further includes customer information.

19. The non-transitory computer-readable medium of claim 15, wherein the matching includes matching based on one or more aspects of the advertising information and one or more aspects of the parcel shipment information.

20. The non-transitory computer-readable medium of claim 15, further comprising causing both a label and an insert to be printed and applied to the parcel and inserted within the parcel, respectively.

\* \* \* \* \*